June 30, 1970 J. AGIN 3,518,625
DEAD TRACK HANDLING
Filed Feb. 24, 1967
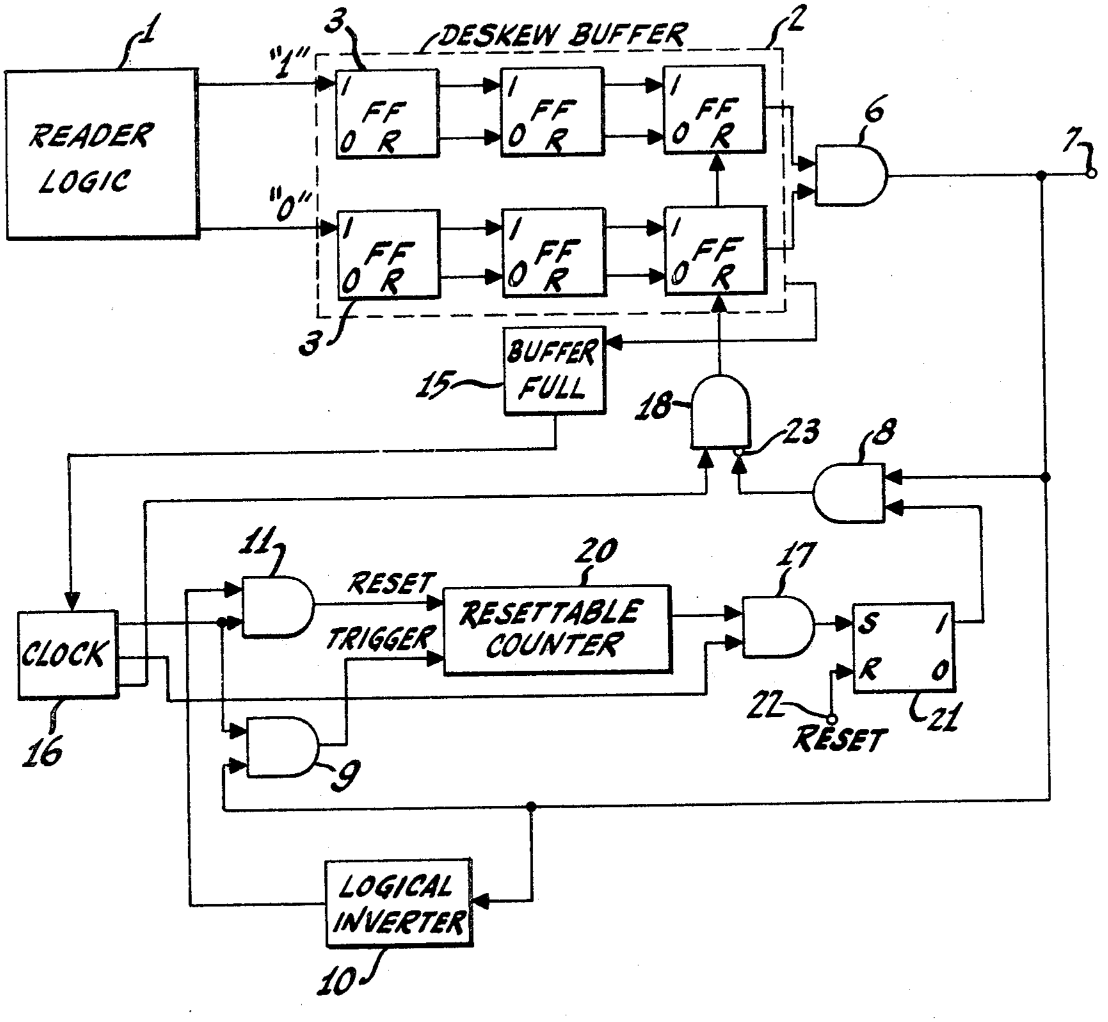
Inventor:
JULIUS AGIN
BY John V. Regan
Attorney United States Patent Office 3,518,625

Patented June 30, 1970

3,518,625

DEAD TRACK HANDLING

Julius Agin, Pennsauken, N.J., assignor to RCA Corporation, a corporation of Delaware Filed Feb. 24, 1967, Ser. No. 618,505
Int. Cl. G11c *29/00*
U.S. Cl. 340—146.1 7 Claims

ABSTRACT OF THE DISCLOSURE

This invention relates to a digital data record playback apparatus which is arranged to sense the presence of an omission, or error, in a reproduced digital signal. The sensed error is arranged to inhibit further operation of the playback apparatus and to provide a signal for subsequent error-correcting apparatus.

BACKGROUND OF THE INVENTION

This invention is arranged to be used in a multi-track magnetic phase recording system in which a character, or byte, is composed of a parallel group of binary information bits recorded in respective tracks. These parallel bits are read by a multi-track head and are brought into synchronism in a deskewing apparatus. The "1" and "0" information bits in each channel are distinguishable from one another by a phase relationship in which the binary information is defined by means of the direction of a zero axis crossing of the reproduced signal. This axis crossing is detected during a predetermined period, or "window," by a logic circuit which is arranged to detect four possible events. Two of the events contain binary information and are represented by a single axis crossing during the "window" time. The other two events are represented by either a missing axis crossing or more than one axis crossing. These latter events represent erroneous information bits and must be identified in order to initiate an error correcting logic later in the playback system. A track on the recording medium containing such errors is commonly referred to as a "dead" track.

SUMMARY OF THE INVENTION

An object of the present invention is to provide an improved apparatus for dead track detection in a multi-track recording system.

Another object of the present invention is to provide an improved dead track detection apparatus for producing a continuous error signal indicative of a dead track.

In accomplishing these and other objects, there has been provided, in accordance with the present invention, a dead track detection apparatus used in combination with a phase recording playback apparatus for monitoring the presence of an error indication from the playback logic. The detection apparatus is used to inhibit the operation of a storage buffer used to store the reproduced data from the playback apparatus. A counter is arranged to count successive errors in the reproduced data signals and to produce an inhibit signal for interrupting the operation of the output circuit of the storage buffer after a predetermined number of successive errors whereby to produce an error indication.

DESCRIPTION OF THE DRAWING

A better understanding of the present invention may be had when the following detailed description is read in connection with the accompanying drawing, in which the single figure is a schematic illustration of a dead track detector embodying the present invention.

DESCRIPTION OF THE PREFERRED EMBODIMENT

Referring to the single figure in more detail, there is shown a dead track detector system having a record reader logic circuit 1 which is arranged to detect the occurrence of a zero axis crossing of reproduced information bits from a record medium, such as a magnetic tape (not shown). While the tape may be multi-track tape having a multi-bit character recorded across the tape, the system shown in the figure has been simplified for purposes of illustration to a single track playback and detection apparatus. The output signals from the logic circuit 1 are applied to a conventional deskew buffer 2. The buffer 2 is arranged to store the reproduced signals and, in the case of a plural track tape, to align, or synchronize, any skewed bits in a multi-bit character.

The buffer 2 may be arranged, as shown in simplified form in the figure, as any suitable sequential storage device, such as a shift register having a plurality of successive flip-flop stages 3 arranged to receive the binary information at an input end of the register and to progressively shift the stored data bits to a register output circuit under the control of shift, or clock, signals generated within the register. A first group of stages 3 are arranged as a first shift register to store the binary "1" information from the reader 1, while a second group of stages 3 form a second shift register for the binary "0" information from reader 1.

An output signal from the "1," or "set," side of the last flip-flop in the first register is combined with a similar signal from the last flip-flop in the second register in a first "AND" gate 6. An output signal from the gate 6 is applied to an output terminal 7, a second "AND" gate 8 and a third "AND" gate 9. This output signal is, also, applied to a logical inverter 10 to produce an output signal which is fed to a fourth "AND" gate 11.

A "buffer full" signal is obtained from the buffer 2 by a suitable logic circuit 15 and is applied to a clock circuit 16. For example, a "buffer full" logic circuit may comprise an OR gate arranged to sense the last stages of the shift registers in the buffer 2. The output signal from the clock circuit 16 is a single train of pulses of which the first is applied as a second input signal to the third gate 9 and the fourth gate 11. The second and third clock pulses are fed to a fifth "AND" gate 17 and a sixth "AND" gate 18, respectively.

An output signal from the third gate 9 is applied as an input, or trigger, signal to a resettable counter 20. An output signal from the fourth gate 11 is applied as a "reset" signal to the counter 20. An output signal from the counter 20 representative of a preset count is applied as a second input signal to the fifth gate 17. An output signal from the gate 17 is applied to the "set" input of a flip-flop 21. A "reset" signal for the flip-flop 21 is obtained from a "reset" terminal 22 arranged to be connected to any suitable "reset" signal generating means, e.g., a delayed output signal from terminal 7. An output signal from the "1," or "set," side of the flip-flop 21 is fed to the second gate 8. An output signal from the gate 8 is applied through a logical inverter 23 as a second input signal to the sixth gate 18.

In operation, the dead track detector of the present invention is arranged to produce a "dead track" representative signal on the output terminal 7 for use for subsequent apparatus, e.g., error-correcting circuits. This error signal is obtained from first gate 6 when both input signals thereto are present. These input signals are applied from the "1" sides of the last flip-flops of both the "0" and "1" groups in the buffer 2. Initially, the reader logic 1 is arranged to detect an error in the reproduced binary data as represented by either a missing zero axis crossing or more than one zero axis crossing during the tape reading time. This detection operation is effective to set both of the first flip-flops in the two groups of flip-flops in the buffer 2 to the "1" state. When this setting has shifted down to the last stage, it is effective to produce an output signal from the first gate 6.

The reset of the detection circuit shown in the figure operates continuously to monitor the buffer 2. Thus, the "buffer full' signal is applied to the clock 16 as soon as the buffer 2 is filled as an indication that read-out of the stored information is ready to begin. The output signal from the clock 16 is used to reset the last stages of the buffer 2 through the gate 18. Since the output of the gate 8 is applied to the gate 18 through a logical inverter, this input of the gate 18 is present unless an error is detected. Therefore, the clock 16 will keep resetting the last flip-flop in the buffer 2 until an error is detected. The clock signal is, also, applied to the gate 11 along with a signal from the logical inverter 10 which is present if the output from the gate 6 is missing, i.e., no error. The output signal from the gate 11 is used to reset the counter 20. Thus, the counter 20 is maintained in a "reset" state until an error is detected.

As soon as an error is detected and the two inputs to the gate 6 are present, the output from the inverter 10 is terminated, and an input signal from gate 6 is applied to the gate 9 along with a clock signal. This combination is effective to produce a gate output signal to the counter 20 to advance it by one count. The counter 20 is preset to produce an output signal after a predetermined number of successive errors have been counted. If an error is succeeded by a proper read-out, the "reset" input to the counter 20 is reactivated, and the counter 20 is reset to await the subsequent count of erroneous bits. On the other hand, if the predetermined count of successive errors is reached by the counter 20, the counter 20 is arranged to produce an output signal which as applied to the gate 17 along with the clock signal. An output signal from the gate 17 is, thereby, produced and used to "set" the flip-flop 21. The output signal from the "set," or "1," side of the flip-flop 21 is combined with error signal from the gate 6 to produce an output signal from the gate 8. Since this output signal is fed through the inverter 23, the inverter 23 is, then, effective to terminate its input signal to the gate 18. Consequently, the reset signal to the last flip-flops in the buffer 2 is inhibited, and the missing bit indication on the output terminal 7 is retained.

In a multi-track system, the two groups of flip-flops forming a shift register for the track having a predetermined consecutive number of errors would, similarly, be held in an error indicating state for the balance of the read-out of the character by the rest of the buffer 2 having stored bits from the other tracks. A "reset" signal can be applied to the flip-flop 21 to remove the inhibiting of the reset signal to the last flip-flop and the aforesaid detection would be repeated since the next proper read-out would reset the counter 20. In a multi-track system, the "AND" gate 6 would be repeated for each bit channel in the buffer. The output circuits from these plural gates would be combined and used as described above for single gate 6. Thus, a succession of errors forming the predetermined count could be obtained from two or more channels.

Accordingly, it may be seen that there has been provided, in accordance with the present invention, a dead track detection apparatus arranged to produce an error signal after a predetermined number of successive errors.

What is claimed is:

1. A record reading system comprising means for reading serially presented recorded binary bits from a recording medium to produce corresponding binary value output signals on respective output lines, storage buffer means having a plurality of pairs of storage stages for storing a binary bit in each of said pairs of storage stages with each stage of a first one of said pairs of storages being connected to a different respective output line of said means for reading and operative to assemble and to store the respective binary bits in serial form, detecting means connected to one of said pairs of storage stages in said buffer means and operative to detect the presence of an error in the binary bit stored in said one of said pairs of storage stages and inhibit means responsive to said detecting means and operative to inhibit further bit storing operation of said buffer means after the detection of an error by said detecting means.

2. A record reading system as set forth in claim 1, wherein said inhibit means includes counting means arranged to count successive errors detected by said detecting means and to trigger an inhibit operation of said buffer after a predetermined number of errors.

3. A record reading system as set forth in claim 2 wherein said detecting means includes AND gate means having input means connected to said one of said pairs of storage stages and arranged to produce an output signal representative of concurrent input signals to said AND gate means from both stages of said one of said pairs of stages and circuit means arranged to apply said output signal to said counting means.

4. A record reading system as set forth in claim 3, wherein said inhibit means includes a reset circuit for normally performing a reset operation on one of said pairs of storage stages in said buffer means and a circuit means connecting an output signal from said counting means after said predetermined number of errors to said reset circuit to inhibit said reset operation.

5. A record reading system as set forth in claim 1 wherein said detecting means includes AND gate means having input means connected to said one of said pairs of storage stages and arranged to produce an output signal representative of concurrent input signals to said AND gate means from both stages of said one of said pairs of stages and circuit means arranged to apply said output signal to said inhibit means.

6. A record reading system as set forth in claim 5, wherein said detecting means is connected to said last one of said pairs of storage stages.

7. A record reading system as set forth in claim 1, wherein said detecting means is connected to said last one of said pairs of storage stages.

References Cited

UNITED STATES PATENTS

| | | | | |
|---|---|---|---|---|
| 3,209,327 | 9/1965 | Brandt | 340—146.1 | |
| 3,245,040 | 4/1966 | Burdett et al. | 340—146.1 | X |
| 2,929,049 | 3/1960 | Lubkin | 340—174.1 | X |
| 2,951,229 | 8/1960 | Goldstein | 340—146.1 | X |
| 3,078,443 | 2/1963 | Rose | 340—146.1 | |

EUGENE G. BOTZ, Primary Examiner

C. E. ATKINSON, Assistant Examiner

U.S. Cl. X.R.

235—61.6, 153; 340—174.1